Patented Jan. 13, 1953

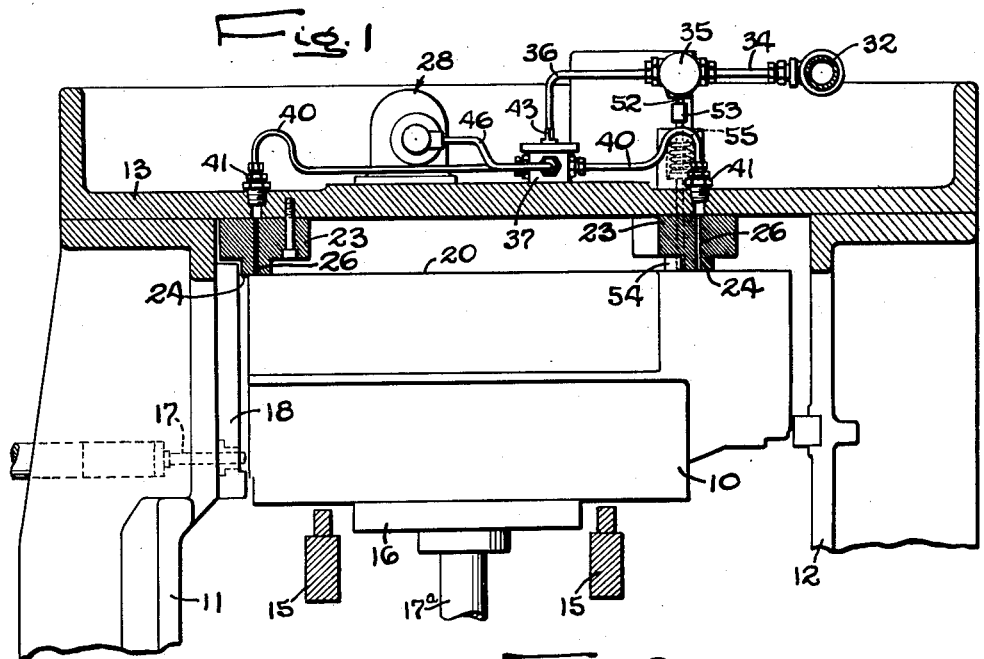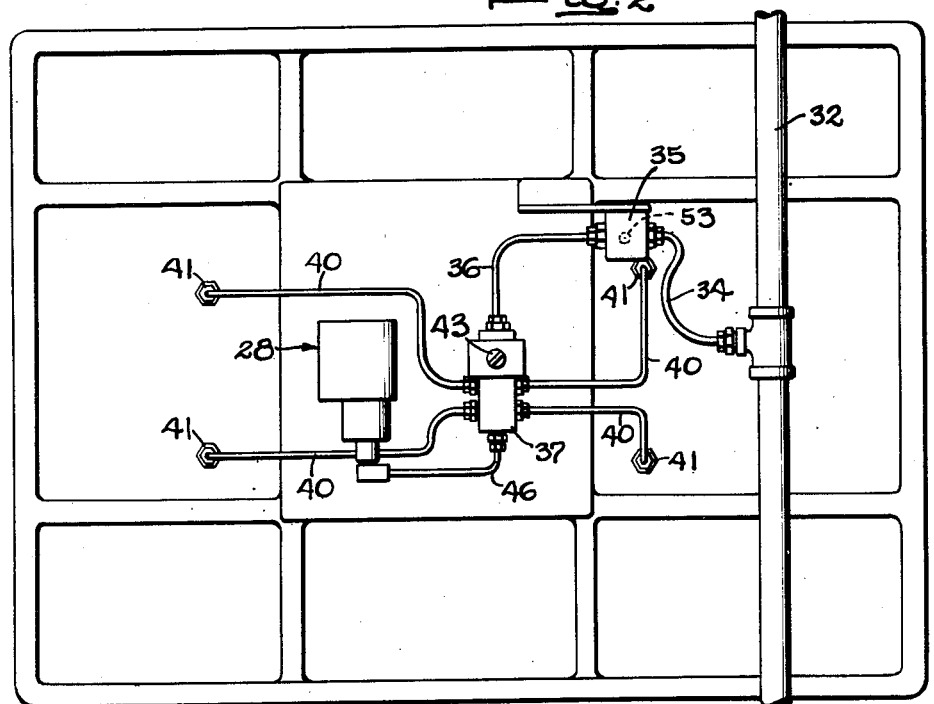

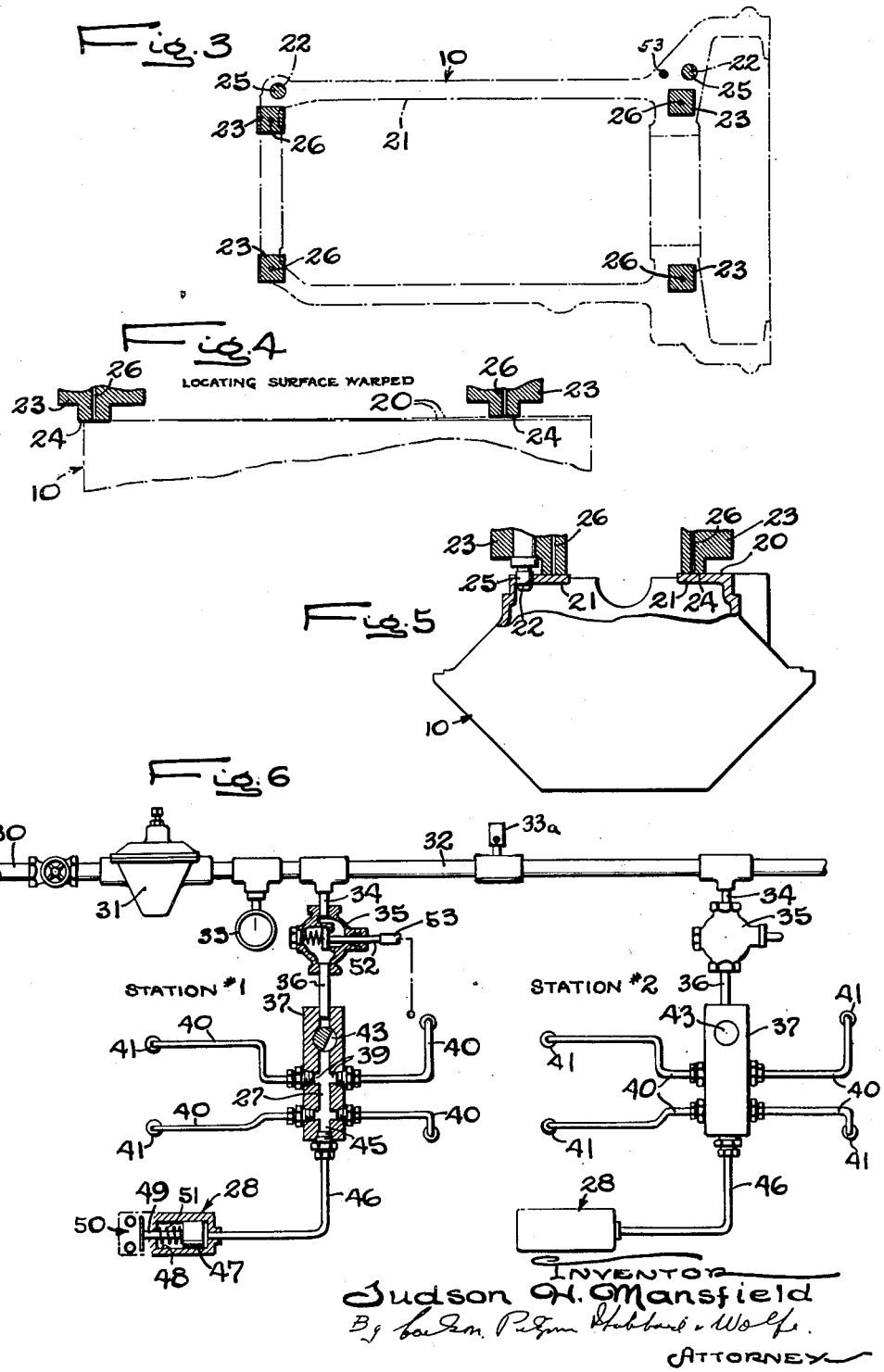

2,625,061

UNITED STATES PATENT OFFICE 2,625,061

WORK POSITION RESPONSIVE CONTROL MECHANISM

Judson H. Mansfield, Rockford, Ill., assignor to Greenlee Bros. & Co., Rockford, Ill., a corporation of Illinois Application April 11, 1949, Serial No. 86,693

4 Claims. (Cl. 77—32)

1

The invention relates to machine tools of the type having work holding fixtures provided with locating surfaces against which a workpiece may be rigidly held or clamped to position it for machining, and it is more particularly concerned with improved mechanism responsive to the position of the workpiece for effecting a control action in accordance with such positioning.

The control mechanism of the invention, while applicable to a wide variety of machine tools, is particularly well adapted for use in transfer machine organizations in which workpieces are delivered to the clamping fixtures by power actuated transfer mechanisms and then shifted into registering engagement with suitable locating surfaces prior to the beginning of a machine cycle. To avoid spoiling workpieces or damaging the tools or machine, such machines are commonly provided with control devices arranged to defer the starting of a cycle until the work is properly positioned in the fixture or to prevent the starting of a machine in case the workpiece is not properly positioned. The control devices usually comprise position-responsive means in the form of electrical switches which may be actuated either by direct engagement with the workpiece or through multiplying leverage mechanisms positioned to be contacted by the workpiece.

With the above in view, one object of the invention is to provide work position responsive means of greater sensitivity than that heretofore available whereby workpieces may be positioned more accurately and therefore machined with a higher degree of precision.

Another object is to provide work position responsive means adapted to automatically remove metal chips or other particles of foreign material from the cooperating locating surfaces of the clamping fixture and workpiece so as to insure accurate positioning of each workpiece in the machine.

Still another object is to provide position responsive means by which the position of the workpiece is determined directly with reference to its relationship to the locating surfaces provided on the machine without the intervention of any intermediate actuating levers or mechanical work contacting devices.

A more specific object is to provide position responsive means in which mechanical work contacting devices are entirely eliminated and by which the position of a workpiece is determined by its effectiveness in restricting air flow through orifices located in a plurality of fixed locating surfaces against which the piece is adapted to be clamped.

2

It is also an object of the invention to provide work position responsive means which is operative to detect any warping or other departure of the workpiece locating surface from a plane.

Other objects and advantages of the invention will become apparent from the following detailed description of the preferred embodiment illustrated in the accompanying drawings, in which:

Figure 1 is a fragmentary transverse sectional view of the work clamping fixture of a machine tool embodying the features of the invention.

Fig. 2 is a plan view of the fixture.

Fig. 3 is a plan view showing the relationship of the workpiece to the locating surfaces of the fixture.

Fig. 4 is a fragmentary side view showing a warped workpiece clamped in the fixture.

Fig. 5 is an end view showing a workpiece properly positioned and clamped in the fixture.

Fig. 6 is a diagram of the pneumatic circuit of the position responsive mechanism.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

By way of illustration, the invention has been shown in association with a fixture of the type used for holding relatively large workpieces, such, for instance, as an internal combustion engine block 10 while drilling, tapping, reaming, boring or other machining operations are performed thereon. As shown in Fig. 1, the exemplary fixture comprises a pair of upright members 11 and 12, rigidly attached to the machine bed (not shown) and spaced apart laterally to receive the workpiece. A heavy ribbed plate 13 extending over and rigidly secured to the upright members 11 and 12 provides a stationary overhead abutment against which the workpiece may be clamped during a machining operation.

In the particular machine illustrated, the workpiece is delivered to the fixture on a pair of horizontally disposed guide rails 15 and is then clamped against the abutment plate 13 by a vertically movable platen 16 carried by a power actuated plunger 17a. The specific machining operations performed, of course, are immaterial in so far as the invention is concerned, but by way of example I have shown a drill 17 being fed to the work through a guide bushing carried by a plate 18 mounted on the upright 11.

To provide for quickly and accurately positioning a workpiece in a clamping fixture of the above general type, it is customary to machine one or more finished locating surfaces thereon as a preliminary or make-ready step in the machining process. In the case of a cylinder block, such as that illustrated, a single locating surface 20 may be machined on the face of the pan rail 21 which extends along both sides of the block at the bottom thereof. It would be understood, of course, that this locating surface is accurately placed so that it may serve as a reference point for determining the precise positions at which subsequent machining operations are to be performed. It is also customary to provide dowel or pilot holes in the workpiece to assist in positioning it laterally. In the present instance, two pilot holes 22 have been shown in the pan rail 21. The block 10, of course, is delivered to the clamping fixture with the locating surface 20 facing the abutment against which it is to be clamped, in this instance in an inverted position with the surface 20 facing upwardly.

For cooperation with the locating surface on the workpiece, the abutment plate 13 is provided with one or more locating elements or pads 23 each having its lower face finished to provide flat locating surface 24. Where the locating surface of the workpiece is planar and relatively large, a plurality of the pads 23 are provided and all are accurately positioned in a common plane. In the exemplary fixture, four of the pads 23 are provided, preferably arranged in a rectangular pattern so as to register with the workpiece adjacent its four corners.

To provide for accurate positioning of the workpiece in a lateral direction, dowel or pilot pins 25 are provided on the abutment plate 13 for reception in the locating holes 22 (Fig. 3) in the pan rail 21. As indicated above, these locating holes are drilled in the workpiece in the preliminary or make-ready stage of the machining process.

The present invention provides means for determining the positioning of the workpiece with respect to the locating surfaces 24 much more accurately than is possible with mechanically operated levers or linkages which are inherently limited by their operating characteristics to a sensitivity in the neighborhood of .015 inch. By eliminating such mechanical instrumentalities, the improved position responsive means is able to detect extremely small deviations of the workpiece from the operating position defined by the locating surfaces 24, in fact, it has been found that sensitivities in the order of .002 inch are readily obtainable under production conditions. Accordingly, a much higher degree of precision in the machining operations may be easily maintained.

In accordance with the invention, this substantial increase in sensitivity is obtained by utilizing the workpiece itself as a throttling element for controlling the escape of a fluid medium, such as compressed air, through an orifice opening 26 provided in the locating surface of the pad 23 or in the surface of each of the pads when a plurality are employed. In the present instance this orifice is defined by a passage extending entirely through the locating pad as shown in Fig. 1. Air is delivered to the orifice 26 through an air supply system including a pressure chamber 27 (Fig. 6) with which is associated a pressure responsive control device 28. The pressure and volume of the air supply for the chamber 27 is closely regulated and accurately coordinated with the effective area of the orifice 26 so that the pressure in the chamber is built up sufficiently to actuate the control device only when air flow therethrough is substantially completely blocked. It has been found practical to coordinate these factors so that a gap on the order of .002 inch between the locating surface 20 of the workpiece and the surface 24 of the locating pad 23 is effective to prevent operation of the control device. In other words, operation of the control device is contingent upon the locating surface 20 engaging substantially flush with the surface 24 of the pad 23.

The sensitivity of the mechanism is enhanced and it is further enabled to detect warpage of a workpiece by utilizing a plurality of the locating pads each of which has an orifice opening. In this case, the several orifices are connected in multiple with the chamber 27 and the air pressure and volume are so regulated that the pressure in the chamber is built up to the critical point only when air flow through all of the orifices is almost completely blocked. This is the condition obtaining when the locating surface of the workpiece is precisely flat and the workpiece is accurately positioned with respect to each one of the pads 23.

In addition to its greater sensitivity and accuracy the improved work position responsive means affords the further advantage of being self-cleaning. More particularly, air discharged through the orifice 26 impinges on the adjacent portion of the locating surface 20 of the workpiece as the latter approaches working position and blows away any metal chips or other foreign particles that may be lodged thereon. A clean surface is, therefore, presented to the locating pad 23 so that the workpiece may be positioned with a high degree of precision.

In the exemplary system shown in Fig. 6, compressed air is taken from a shop line 30 or other suitable source by way of conversional pressure reducing and regulating valve 31 and supply line 32. If desired, this supply line may serve the position responsive mechanisms at a plurality of machine stations, two such stations No. 1 and No. 2 being shown by way of example. As the mechanism is the same at each station, a description of one will suffice. The valve 31 is common to a plurality of stations and is preferably adjustable. A suitable pressure indicating gauge 33 is provided in close proximity to the valve 31 to facilitate adjustment of the valve. A blow-off valve 33a limits the pressure in the system to a predetermined maximum value.

At each machine station a branch line 34 of the supply line 32 extends through a shut-off valve 35 and conduit 36 to the chamber 27. The chamber or manifold is defined by a housing 37 which, in this instance, is mounted on the upper face of the abutment plate 13 as shown in Fig. 1 and Fig. 2. In the particular housing shown, the chamber 27 is in the form of an elongated internal passage communicating at one end with the conduit 36 and with the orifices 26 through four laterally opening outlet ports 39. These ports are respectively connected by conduits 40 with the orifices 26 in the four locating pads 23. In the present instance each of the conduits 40 terminates in a fitting 41 threaded into an aperture in the abutment plate 13 which is alined with one of the orifice passages 26.

To coordinate the volume of air supplied to the chamber 27 with the effective area of the orifices 26, I provide an adjustable metering valve between the shut-off valve 35 and the chamber 27. In the exemplary mechanism this metering valve comprises a rotary valve meter 43 seated in a cylindrical chamber in the housing 37 which opens into one end of the chamber 27. By rotating the valve member 43, the area of this opening may be regulated as required. In practice it has been found that ample sensitivity is obtained with quick response of the mechanism when the metering valve is set so that the metering orifice area is approximately seventy-five per cent of the combined areas of the orifices 26.

The chamber 27 has an additional outlet port 45 connected by a conduit 46 with the pressure responsive control device 28. The control device is thus subjected to the pressure obtaining in the chamber 27. While the control device may be of any preferred construction, it is herein represented as having a piston element 47 working in a cylinder 48, one end of which communicates with the conduit 46. A rod 49 extending from the piston through the other end of the cylinder is arranged to actuate the movable element of an electrical switch 50. The particular switch shown is normally maintained in open condition by a spring 51 acting on the piston 47, the spring being designed to hold the switch open until the pressure exerted on the piston 47 reaches a predetermined value as mentioned heretofore.

It will be appreciated that the switch 50 may be incorporated in the control system of the machine tool in various ways. It may, for example, be interlocked with other switches so as to start a machine cycle incident to the effective clamping of the workpiece or the completion of some other phase of the machine cycle. Alternatively, the switch may be interposed in a starting circuit along with a manually operable starting switch so as to prevent the machine cycle until the work is from starting the machine cycle until the work is effectively clamped in machining position. In either of these arrangements the switch 50 constitutes disabling means effective to prevent initiation of a machining operation until an unwarped workpiece has been moved into position for machining. Where positive safety interlocking is not required the switch may be utilized to operate a signal to provide a visual or audible indication that the workpiece is or is not in position for machining.

To avoid excessive drain on the air supply when the machine is idle or while the workpiece is being delivered to or removed from the fixture, provision is made for opening the shut-off valve 35 only when the workpiece approaches or is in contact with the locating pads 22. The valve 35 as shown in Fig. 6 is spring biased to a closed position and has a projecting operating stem 52. A plunger 53 (Fig. 1) supported and guided for endwise movement in a bushing 54 on the abutment plate 13 has one end positioned for cooperation with the valve stem and the other end positioned for engagement by the workpiece as the latter approaches clamping position. A spring 55 enclosed within the bushing 54 urges the plunger away from the valve stem so that the valve may close in the absence of the workpiece. As the workpiece is shifted into clamping position it, in turn, shifts the plunger 53 to open the valve 35 and thus admit air to the chamber 27.

In the operation of the improved work position responsive mechanism, air is shut off from chamber 27 during idle periods and while the workpieces are being changed. There is therefore no waste of compressed air. As the clamping means shifts the workpiece in proximity to the pads 23, shut-off valve 35 is opened thereby initiating the flow of compressed air to the chamber 27 at a pressure determined by the setting of the valve 31 and in volume determined by the setting of the metering valve 43. The pressure and volume of the air supply are coordinated with the effective area of the orifices 26 so that these orifices are enabled to bleed sufficient air from the chamber to maintain the pressure therein substantially below that required to operate the control device 28. The control device accordingly remains inoperative with switch 50 open, thereby either directly or indirectly preventing the initiation of a machine cycle.

When the workpiece is accurately positioned for a machining operation, the locating surface 20 thereon engages substantially flush with the locating surfaces 24 of the pads 23, thereby blocking all of the orifice 26 and interrupting further escape of the air from the chamber 27. Pressure in the chamber increases rapidly and control device 28 responds by closing switch 50. The machine cycle may then proceed in normal manner.

By reason of the accurate coordination of the air supply with the effective orifice area, failure of the workpiece to substantially completely block any one of the orifices 26 will allow sufficient air to escape from the chamber 27 to prevent operation of the control device 28. Thus, when the locating surface 20 of the workpiece is not precisely planar, due either to inaccurate initial machining or to warping of the workpiece, at least one of the orifices 26 will be unblocked as shown in Fig. 4. This is effective to prevent operation of control device 28 and the consequent failure of the machine to start will warn the attendant so that the defective workpiece may be removed before any machining operations are performed thereon which might prevent salvaging the workpiece. Also the presence between the locating surfaces of a metal chip or other foreign particle large enough to adversely affect the position of the workpiece will prevent initiating a machine cycle until the particle is removed. Such occurrences are infrequent, however, as the air issuing from the orifice is generally effective to blow such foreign particles from the workpiece. In any case, the improved work position responsive mechanism effectively prevents starting of a machine cycle until the workpiece is properly and accurately positioned for the performance of the machining operations.

I claim as my invention:

1. A machine tool comprising, in combination, a cutting tool, disabling means associated with said cutting tool and effective to prevent operation of the cutting tool, a work clamping fixture for clamping a workpiece in position for machining, means associated with said fixture and said disabling means and responsive to positioning of an unwarped workpiece in said fixture for rendering said disabling means ineffective to prevent operation of said cutting tool, said last mentioned means including at least four locating pads each of which has a locating surface thereon positioned to limit movement of a workpiece in one direction common to all of said pads, said surfaces being positioned to contact simultaneously locating surfaces of an unwarped workpiece, means associated with said pads and responsive to the presence of locating surfaces on a workpiece in close proximity to said surfaces on all of said pads to indicate the condition of the workpiece as to warpage, said means last mentioned including an orifice in each of said pads disposed in position to be covered by locating surfaces on the workpiece, an air chamber connected with each of said orifices, controlled pressure means connected to said chamber and effective to change the mass of air in said chamber to create a pressure differential between the pressure in said chamber and atmospheric pressure, a control device associated with said chamber and operable upon establishment of a predetermined pressure therein to render said disabling means ineffective, said orifices and said controlled pressure means being coordinated so that said orifices are effective to bleed sufficient air between said chamber and the atmosphere to prevent the pressure in said chamber from reaching said predetermined value until all four of the orifices are closed by an unwarped workpiece.

2. For use with a machine tool, a work holding fixture capable of sensing the correct positioning of an unwarped workpiece and comprising, in combination, work supporting means, at least four locating pads on said supporting means, each of said pads defining a locating surface thereon positioned to limit movement of a workpiece in one direction common to all of said pads, said surface being positioned to contact simultaneously coacting locating surfaces of an unwarped workpiece, means associated with said pads and responsive to the presence of locating surfaces of a workpiece in close proximity to all of said pad surfaces to indicate correct positioning of a workpiece and the condition of the workpiece as to warpage, said last mentioned means including an orifice in each of said pads disposed in position to be covered by coacting locating surfaces on the workpiece, an air manifold connected with each of said orifices, controlled pressure means communicating with said manifold and effective to change the mass of air therein to create a pressure differential between the air within said manifold and the atmosphere, a sensing device associated with said manifold and operable in response to the establishment of a predetermined pressure therein, said orifices and said controlled pressure means being coordinated so that said orifices are effective to bleed sufficient air between said manifold and the atmosphere to prevent the pressure in said manifold from reaching said predetermined value until all four of said orifices are closed by an unwarped workpiece.

3. For use with a machine tool, a work holding fixture capable of sensing the correct positioning of an unwarped workpiece and comprising, in combination, work supporting means defining at least four critical locating surface areas thereon positioned to contact simultaneously coacting locating surfaces of an unwarped workpiece and thus serving to limit movement of a workpiece in one direction common to all of said surface areas, means associated with said respective surface areas and responsive to the presence of locating surfaces of a workpiece in close proximity to all of said surface areas to indicate correct positioning of a workpiece and the condition of the workpiece as to warpage, said last mentioned means including an orifice in each of said critical surface areas and disposed in position to be covered by coacting locating surfaces on the workpiece, an air manifold connected with each of said orifices, controlled pressure means communicating with said manifold and effective to change the mass of air therein to create a pressure differential between the air within said manifold and the atmosphere, a sensing device associated with said manifold and operably responsive to the establishment of a predetermined pressure therein, said orifices and said controlled pressure means being coordinated so that said orifices are effective to bleed sufficient air between said manifold and the atmosphere to prevent the pressure in said manifold from reaching said predetermined value until all four of said orifices are closed by an unwarped workpiece.

4. In a machine tool the combination comprising, disabling means for preventing operation of the machine tool, a work clamping fixture, means for accurately locating a workpiece in said fixture and determining the condition of the workpiece as to warpage, said last mentioned means including an abutment member and at least four locating pads on said member, said pads each defining a locating surface displaced from the adjacent surface of said abutment member, an orifice in each of said pads, means for supplying air under pressure to said respective orifices, said pads being positioned to cause registration of said locating surfaces and said orifices with coacting locating surfaces on the workpiece upon movement of the latter into machining position, said orifices directing air outwardly therefrom to effectively blow foreign particles from said pad locating surfaces and coacting workpiece locating surfaces, and pressure responsive means connected to said air supplying means and operated upon the closure of all of said orifices to render said disabling means ineffective for preventing operation of the machine tool.

JUDSON H. MANSFIELD.

REFERENCES CITED

The following references are of record in the file of this patent:

UNITED STATES PATENTS

| Number | Name | Date |
|---|---|---|
| 1,927,750 | Mennesson | Sept. 15, 1933 |
| 1,979,479 | Le Land | Nov. 6, 1934 |
| 2,438,696 | Fox et al. | Mar. 30, 1948 |